US006626129B2

United States Patent
Schrader

(10) Patent No.: US 6,626,129 B2
(45) Date of Patent: Sep. 30, 2003

(54) AQUA CLEAN BIRDCAGE COMPANION

(76) Inventor: Rhonda Schrader, 947 Franklin Ave., Winthrop Harbor, IL (US) 60096

( * ) Notice: Subject to any disclaimer, the term of this patent is extended or adjusted under 35 U.S.C. 154(b) by 0 days.

(21) Appl. No.: 10/121,100

(22) Filed: Apr. 11, 2002

(65) Prior Publication Data

US 2002/0185081 A1 Dec. 12, 2002

Related U.S. Application Data

(60) Provisional application No. 60/286,106, filed on Apr. 24, 2001.

(51) Int. Cl.$^7$ ............................ A01K 1/01; A01K 31/04
(52) U.S. Cl. ........................................ 119/479; 119/462
(58) Field of Search ................................ 119/462, 469, 119/479, 467, 463, 163, 450, 421

(56) References Cited

U.S. PATENT DOCUMENTS

| | | | | |
|---|---|---|---|---|
| 3,429,297 A | * | 2/1969 | Schroer | 119/417 |
| 3,896,768 A | * | 7/1975 | Galloway | 119/458 |
| 4,009,685 A | * | 3/1977 | Sojka | 119/458 |
| 4,181,612 A | * | 1/1980 | Trail | 210/169 |
| 4,572,107 A | | 2/1986 | Clarizo | |
| 4,838,204 A | * | 6/1989 | Young | 119/471 |
| 5,148,771 A | | 9/1992 | Schuett et al. | |
| 5,156,640 A | | 10/1992 | Del Rosario | |
| 5,771,841 A | * | 6/1998 | Boor | 119/452 |

FOREIGN PATENT DOCUMENTS

WO    WO 98/04122 A1  *  2/1998   .......... A01K/31/04

* cited by examiner

Primary Examiner—Charles T. Jordan
Assistant Examiner—John W. Zerr

(57) ABSTRACT

The Aqua Clean BirdCage Companion is a hydraulic waste and airborne contaminant containment system disposed beneath a birdcage, occupying a bird. The birdcage, having a grid floor retains and separates the bird from the system, while allowing the waste and airborne contaminants from the caged bird to gravitate to the system's constant medium being a hydraulic body of water contained in a tray beneath the birdcage. Our constant medium traps, contains and moves waste and airborne contaminants within it's water to a plurality of filters. The waste filled water passes through the filters. The filters remove the waste materials. The now filtered water is returned by electric pump and discharged into the tray's constant medium creating the hydraulic body, which traps and contains new waste for removal. The filters continually renew the water in this closed hydraulic waste and airborne contaminant containment system.

3 Claims, 3 Drawing Sheets

AQUA CLEAN BIRDCAGE COMPANION

This application claims the benefit of provisional application No. 60/286,106, filed Apr. 24, 2001.

BACKGROUND

1. Field of Invention

The present invention relates to birdcages and a process for continuous cleaning and removal of allergens.

2. Description of Prior Art

Today's birdcage is a wire cage enclosure with a grid on the bottom to contain the bird yet allows waste to pass through A pullout tray underneath the grid is customarily lined with newspaper and is removed and replaced as needed. No medium is provided which can contain, suspend and automatically remove the bird dander, feathers and airborne particulate, which are known to cause serious and life threatening respiratory problems.

Managing pet birds, commercially or residentially, can be a health hazard to humans and birds because of the airborne bacteria and disease caused from bird dander and dried bird waste.

Numerous cages and cage cleaning systems have been provided in the prior art, all provide some measure of cleaning but lack the ability to minimize allergens and continuously clean and contain waste with minimal effort or maintenance.

Several types of flush systems have been proposed—for example in U.S. Pat. No. 4,181,612 to Trail (1980) and U.S. Pat. No. 5,148,771 to Schuett et al (1992) which suffer from a number of disadvantages:

(a) The waste can become dried between flush operations creating a difficult cleaning task.
(b) Waste and seeds can fall on semi-dry areas and bounce out of the enclosure.
(c) The intermittent operation of the flush system may agitate or frighten caged birds.
(d) The complicated systems have much apparatus to clean and maintain
(e) Only the specified cage can be used with the systems.

The following types of cage cleaning inventions, for example in U.S. Pat. No. 5,156,640 to Del Rosario (1992) and U.S. Pat. No. 4,572,107 to Clarizo (1986) also suffer from a number of disadvantages:

(a) Waste becomes dried, bacteria becomes airborne within the enclosed cage making it hazardous to the caged bird.
(b) Only the specified cage can be used with the systems.

Accordingly the problem of airborne particulate and dried waste has not been successfully addressed by prior invention.

Objects and Advantages

Several objects and advantages of the containment system are:

(a) To provide a healthy environment for humans and birds by containing waste and allergens in a safe, manageable embodiment.
(b) To provide gradual removal of waste allowing it to be viewed for a short time, which is necessary for the early detection of illness in birds.
(c) To provide a soothing sound and relaxing environment for birds and humans by the movement of water.
(d) To provide an easily adaptable system to accommodate the variety of sizes and styles of cages used for residential, as well as commercial use.
(e) To provide simplicity of bird keeping by the continuous cleaning of this invention.
(f) To provide ease of maintenance for the bird owner, by the continuous cleaning action and the basic operation of the system.
(g) The durable stainless steel components provide a non-porous surface which prohibit bacterial growth
(h) The continuous movement of water provides welcome humidity for birds.
(i) Ease of use is provided by the large liquid surface, which continuously cleans waste and airborne particulate, and channels it into a small unseen area to be emptied as needed.
(j) Fragrance may be added to the water to provide pleasant aromatherapy Other advantages will become apparent from consideration of the ensuing description and drawings.

SUMMARY

In accordance with the present invention the Aqua Clean Birdcage Companion employs a shallow body of water with a gentle current, flowing across a stainless steel tray, trapping and removing the waste and particulate within the water. The waste is carried off the edge of the tray into a plurality of filters, which clean the water in this closed system. The circulating pump returns the filtered water back to the tray to collect new waste and airborne particulate.

DRAWINGS

Drawing Figures

Aqua Clean BirdCage Companion may be more clearly understood from the following detailed description and by reference to the drawings in which.

REFERENCE NUMERALS IN DRAWINGS

| | | | |
|---|---|---|---|
| 11 | water | 12 | tray |
| 13 | plastic tube | 14 | tray notch |
| 15 | T-fitting | 16 | hopper |
| 17 | slats | 18 | base member |
| 19 | flexible tubing | 20 | deflector cap |
| 21 | pullout shelf | 22 | hole for tubing |
| 23 | hole for electric cord | 24 | bird cage |
| 25 | grid floor | 26 | mesh basket |
| 27 | funnel | 28 | acrylic filtering unit |
| 28A | filtering compartment | 28B | filtering compartment |
| 29 | pump | 30 | capped drain hole |
| 31 | foam mat | 32 | fiberglass blocks |
| 33 | carbon cartridge | 34 | electric cord |

-continued

| 35 | plastic tube holes | 36 | deflector cap notch |
| 37 | angled surface of deflector cap | 38 | hopper notch |
| 39 | plastic grid | 40 | fill line |
| 41 | end caps | 42 | reservoir of water |
| 43 | hinged door | | |

DETAILED DESCRIPTION

Figure 1:
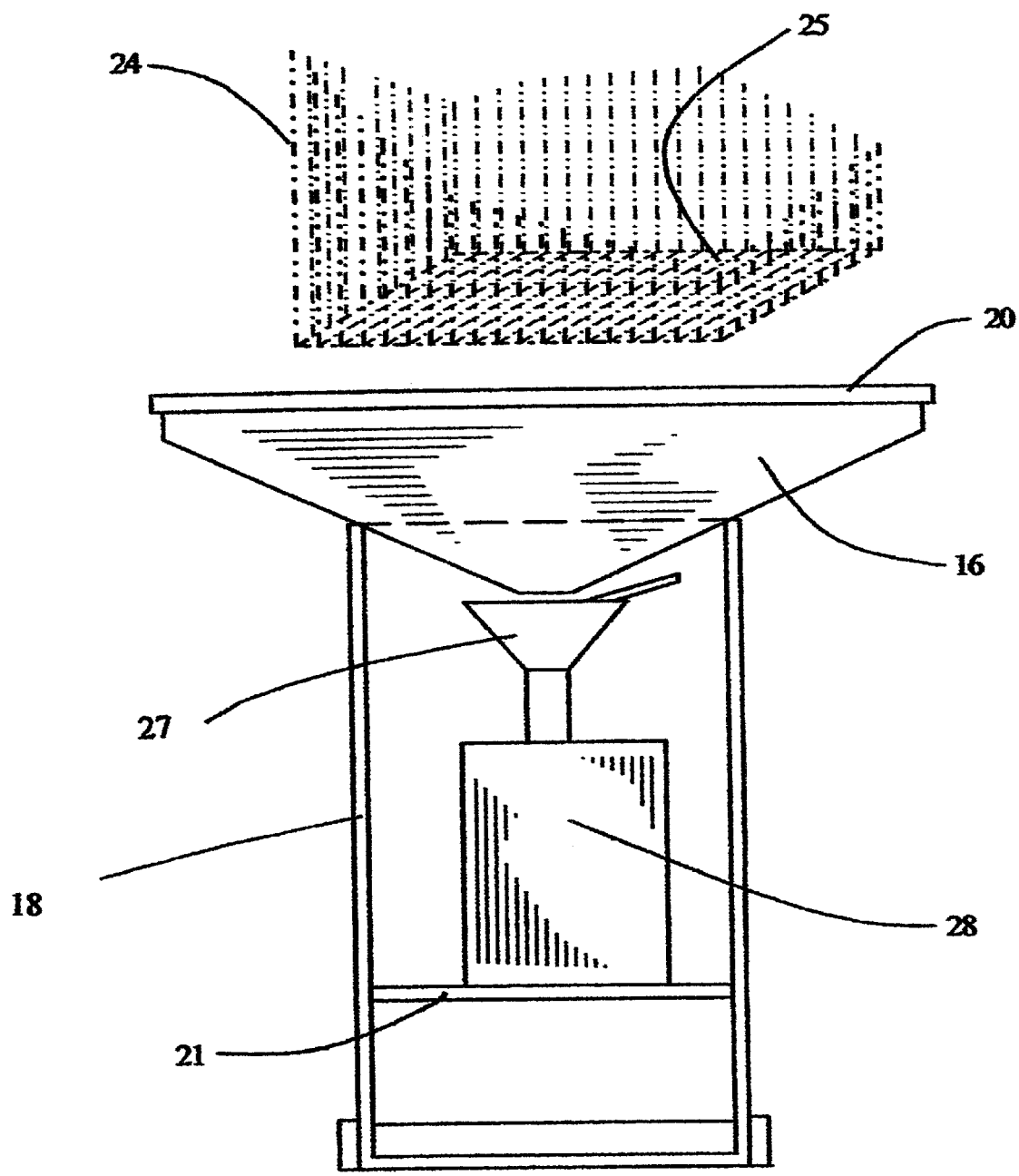
FIG. 1 is a front elevational view of the complete Aqua Clean BirdCage Companion with a typical birdcage suspended above the same.
Figure 2:
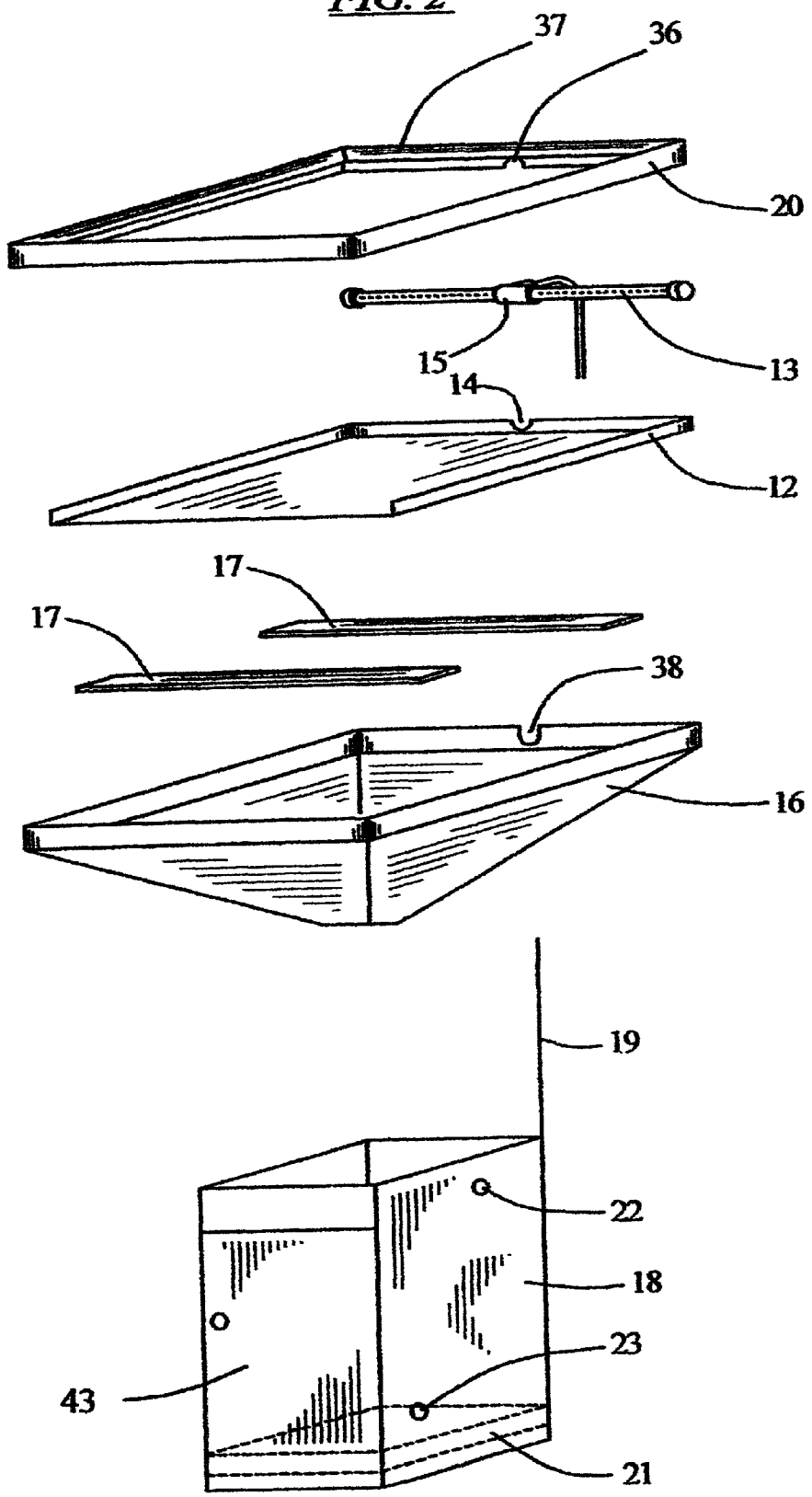
FIG. 2 is an exploded view of the Aqua Clean BirdCage Companion showing the deflector cap, the plastic tubing, the tray, support slats and the hopper as it relates to the bottom cabinet that houses the filtration system and pump.
Figure 3:
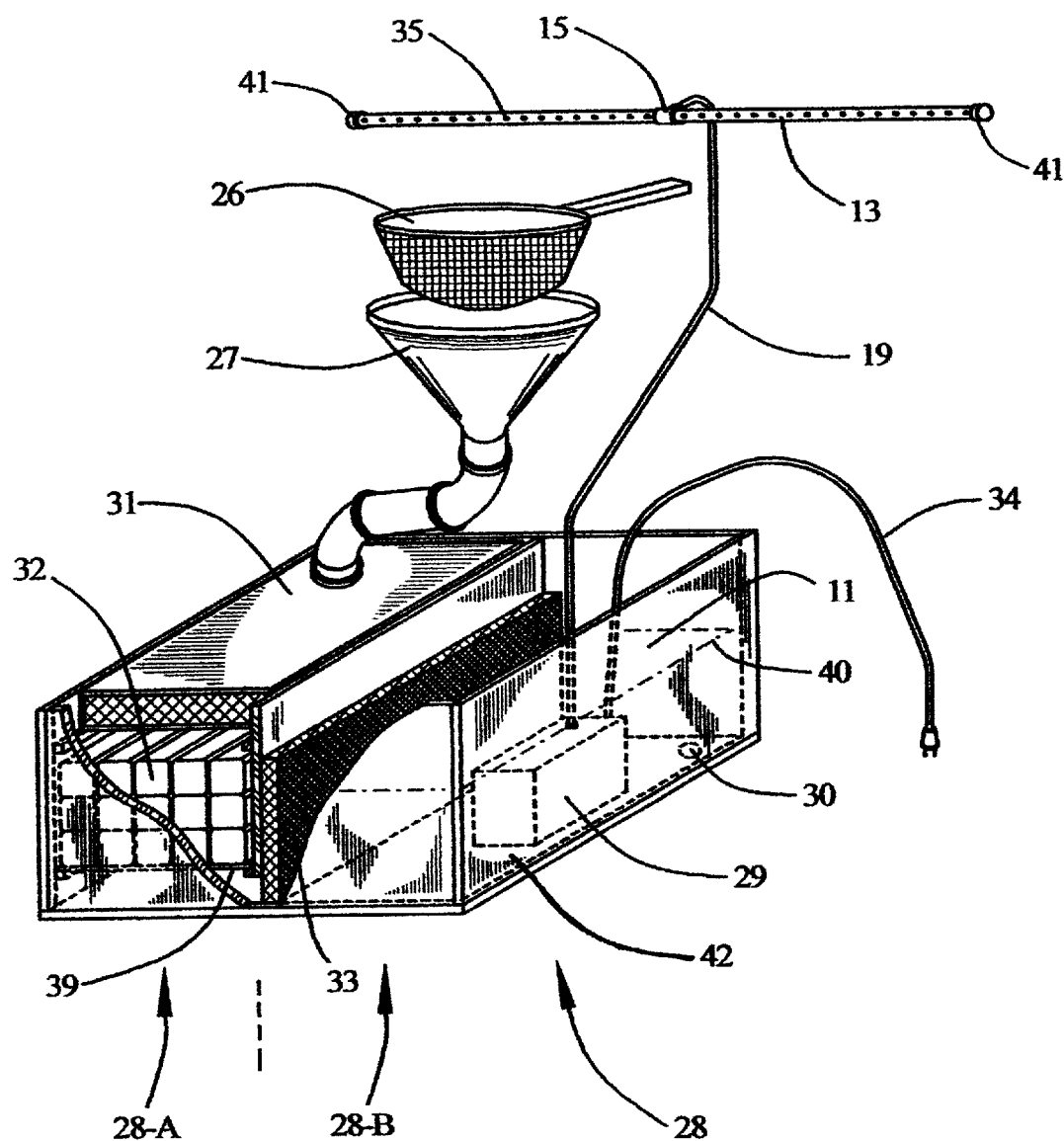
FIG. 3 is a perspective view of the multiple filtration system and the circulating pump cabinet that the dual compartment acrylic unit; the acrylic unit is housed in the base member directly beneath the hopper.

Description—FIG. 1–3 Preferred Embodiment

The drawings disclose the preferred embodiment of the present invention. While the configurations according to the illustrated embodiments are preferred it is envisioned that alternate configurations of the present invention maybe adopted without deviating from the invention as portrayed.

Turning now descriptively to the drawings, in which similar reference characters denote similar elements throughout the several views, FIGS. 1–3 illustrate the Aqua Clean Bird Cage Companion that consists of a flat, three-sided tray 12, a hopper 16, a box like base member 18 and a filter unit 28. FIG. 1 denotes similar elements, above which is a birdcage 24.

The birdcage 24 has a grid floor 25 for passage of waste therethrough. The tray 12 is below the cage 24 and when operational contains a shallow body of moving water 11 for the receiving of waste passing through the grid floor 25 of the cage 24. The tray 12 has a floor and three raised sides. The fourth side is open which allows waste filled water to exit the open edge of tray 12 and enter the hopper 16 directly below.

On the opposing side of the open edge within the tray 12 lies a plastic tube 13 with caps 41 on both ends and a T-fitting 15 in the center. The plastic tube 13 has a plurality of holes 35 in which water 11 is pumped to create a current within the shallow body of water 11 contained in the tray 12. Additionally, tray 12 has a notch 14 on the opposing side of the open edge to receive the T-fitting 15 which connects the plastic tube 13 to the flexible tubing 19.

The deflector cap 20 is a detachable collar that rests on and covers the top perimeter of the tray 12 with an angled surface 37 to deflect debris inward. Additionally, the cap 20 contains a notch 36 to receive the T- fitting 15.

The hopper 16 is slightly larger in diameter than the tray 12 and supports the tray 12 by use of slats 17 that span the opening and maintain an opening for the water to exit the tray 12. The hopper 16 is beneath the tray 12 and consists of four sides in which the support slats 17 and the tray 12 sit within. Each side is bent to form a conical surface that slopes downward creating a funnel shaped opening. One side contains a notch 38 to receive the T-fitting 15. The waste filled water 11 exits the hopper 16 and enters the funnel 27 which contains a mesh basket 26 for daily disposal of debris such as seed and hulls. The funnel 27 and basket 26 sit atop the acrylic filtering unit within the base member 18. The base member 18 has a dual function, it supports the hopper 16 and secondly houses the funnel 27, the basket 26, the acrylic filtering unit 28 and the circulating pump 29. It further contains a hinged door 43 on one side for easy access to a pullout shelf 21 on which the acrylic filtering unit 28 rests. The back of the base member 18 has access holes for tubing 22 and electricity 23. Water 11 and finer particulate flow into the acrylic unit 28. The water and finer particulate first enter the two different filtering systems located within the first compartment of the acrylic unit 28A.

The first consists of a coarse foam mat 31 which catches and holds the finer particulate such as dander and granular waste and is removed, rinsed and replaced as needed. The second filter is a biological filter, which consists of a plurality of fiberglass blocks 32 that rest on a plastic grid 39, directly below the foam matt 31. The fiberglass blocks house a bacterial colony, which purify the water 11 on a continuous basis. The purified water 11 flows into the second compartment of the acrylic unit 28B that contains the carbon cartridge 33 and the circulating pump 29 within the reservoir 42 of water 11. The final filter is a cartridge of carbon 33, which continues to purify the water 11 and remove odors. The carbon cartridge 33 can be changed as often as necessary. The pump 29 is connected to flexible tubing 19, which exits the base member 18 through a hole 22 and connects to the T- fitting 15 in the tray 12. Additionally the acrylic unit 28 has a capped drain 30, which provides for easy draining of water 11 without disturbing or removing the filtration unit 28.

Alternative Embodiments

While the description above contains many specifications, these should not be construed as limitations on the scope of the invention, but rather as an exemplification of one preferred embodiment thereof Many other variations are possible. For example;

A. The Aqua Clean BirdCage Companion can easily adapt to a large floor model birdcage whereby the cage rests within the tray 12 on stainless steel supports. The grid floor 25 of the birdcage would remain while the seed tray; legs and casters of a typical floor model birdcage would be eliminated. The size of the tray 12 would be increased. The basket 26 and the funnel 27 are adapted to become a lift out screen within the hopper 16. The hopper 16 is positioned directly over the acrylic unit 28, which would be increased in size, as well as determining the pump 29 size required.

B. Another example would be a small version of the floor model intended for tabletop use with small cages. Whereby the size of the tray 12, hopper 16 and pump 29 are reduced and the acrylic-filtering unit 28 is on a smaller scale.

C. Another embodiment would be a connected series of trays 12, hoppers 16 and baskets 26 in a horizontal fashion. This configuration would provide for multiple cages to be located above the connected series of this system. This multiple configuration could be constructed for commercial use to provide easy maintenance and creates excellent health conditions when housing many birds. The acrylic filtering unit and pump size would be increased to handle the larger volume of water. Accordingly, the scope of the invention should be determined not only by the embodiment illustrated, but also by the appended claims and their legal equivalents.

Advantages

From the description above, a number of advantages of my Aqua Clean BirdCage Companion become evident:

(a) To provide a healthy environment for humans and birds by containing waste and allergens in a safe, manageable embodiment.

(b) To provide gradual removal of waste allowing it to be viewed for a short time, which is necessary for the early detection of illness in birds.

(c) To provide a soothing sound and relaxing environment for birds and humans by the movement of water.

(d) To provide an easily adaptable system to accommodate the variety of sizes and styles of cages used for residential, as well as commercial use.

(e) To provide simplicity of bird keeping by the continuous cleaning of this invention.

(f) To provide ease of maintenance for the bird owner, by the continuous cleaning action and the basic operation of the system.

(g) The durable stainless steel components have rounded edges for safety of both birds and humans.

(h) The durable stainless steel components provide a non-porous surface which prohibit bacterial growth (i) The continuous movement of water provides welcome humidity for birds.

(j) Ease of use is provided by the large liquid surface, which continuously cleans waste and airborne particulate, and channels it into a small unseen area to be emptied as needed.

(k) Fragrance may be added to the water to provide pleasant aromatherapy.

Operation—FIGS. 1, 2, 3

The manner of using the Aqua Clean BirdCage Companion is to position a birdcage 24, which has a grid 25 for passage of waste, over the stainless steel tray 12. To begin operation the acrylic-filtering unit 28 is filled with water 11 to the fill line 40 and the circulating pump 29 is activated using household electricity. An immediately clean and healthy environment is created with the soothing and relaxing sound of moving water 11. The stainless steel deflector cap 20 rests on and covers the top perimeter of the tray 12 and the plastic tube 13. The deflector cap 20 has an angled surface 37 to deflect debris inward, protects the tube 13 from damage and prevents waste from getting on or behind the tube 13. The tube 13 is connected to the T-fitting 15 in the center, which exits the tray 12 and is connected to the flexible tubing 19. The tubing 19 is beneath the tray 12, enters the base member 18, and connects to the pump 29 housed within the base member 18. The operational Aqua Clean BirdCage Companion employs a shallow body of water 11 that continuously flows across the tray 12. The water 11 is pumped through a plurality of holes 35 in the plastic tube 13. The moving water 11 traps, contains and gradually removes waste and airborne particulate from view. The waste filled water 11 flows off the open edge of the tray 12 and enters the stainless steel hopper 16. The hopper 16 is supported by the base member 18 which houses the funnel 27, the mesh basket 26, the acrylic filtering unit 28 and the pump 29. The conical shaped hopper 16 channels the water 11 into the funnel 27, which contains a mesh basket 26 for daily disposal of debris such as seed and hulls. The water 11 and finer particulate continue through the funnel 27 into the dual compartment acrylic filtering unit 28, 28A, 28B which house the water 11, the reservoir 42 and three different filtering systems.

The compartment 28A contains the first and second filters. The first filter comprises a coarse foam mat 31 which catches and holds the finer particulate such as dander and granular waste, yet allows water 11 to flow into the second filter directly below. The biological filter rests on the plastic grid 39 and comprises a plurality of fiberglass blocks 32, that house a bacterial colony which purify the water 11 on a continuous basis. The compartment 28B contains the final filter 33, the circulating pump 29 and the reservoir of water 42. Compartment 28B receives the water 11 through an opening in the bottom of the acrylic divider from Compartment 28A. The filter is a carbon cartridge 33, which removes odors and purifies the water 11 as it is collected in the reservoir 42 in compartment 28B. The pump 29 is connected to the flexible tubing 19, which exits the base member 18 and connects to the T-fitting 15 within the tray 12. Filtered water is returned back to the tray 12 to trap and collect waste, whereby the water is continuously renewed as a constant medium by the filter unit. This completes the circulating closed water system.

Accordingly, the reader will see the ease of use provided by the Aqua Clean BirdCage Companion. To maintain maximum efficiency of this invention the following steps are taken daily:

1. Turn off the circulating pump 29.
2. Remove the mesh basket 26 and empty collected waste.
3. Replace the basket 26.
4. Check the fill line 40 and add the required amount of water 11.
5. Turn on the pump 29.

To maintain maximum efficiency of this invention the following steps are taken weekly or as needed:

1. Turn off the circulating pump 29.
2. Lift out the coarse foam mat 31, rinse and replace.
3. Lift out the carbon cartridge 33, rinse and replace.
4. Turn on the pump 29.

Additionally for relocation or draining of the system, the acrylic unit 28 has a capped bottom drain 30, which provides for easy draining of the water 11 without disturbing or removing the unit 28. While certain novel features of this invention have been shown, it will be understood that various changes of the system illustrated and in its operation can be made by those skilled in the art without departing from the spirit of the invention.

Conclusion, Ramifications, and Scope

Accordingly, the reader will see that the continuous cleaning of the Aqua Clean BirdCage Companion provides a healthy and clean environment for humans and birds by containing harmful allergens and bacteria found in bird waste, feathers and dander. In addition to the healthy and clean environment, the hydraulic system provides humidity and or fragrance along with the soothing sound of moving water.

This system with it basic design provides for ease of maintenance, ease of use and ease of cleaning in addition to providing automatic and continuous cleaning during the normal operation. The preferred material of the exposed components in this system, being stainless steel provide a durable non-porous surface which prohibits bacterial growth and is easily cleaned. The design of these components have rolled edges to provide a safe and long lasting surface. The system is easily adaptable to accommodate the variety of sizes and styles of cages and can be connected in series to accommodate multiple cages. Lastly, the system can be easily adapted to accommodate cages that contain a bottom grid designed for reptiles and other animals which may require humidity in their environment. Accordingly the scope of the invention should be determined not by the embodiments illustrated but by the appended clams and their legal equivalents.

What is claimed is:

1. A birdcage, comprising:
    a containment system for handling waste and airborne contaminants, comprising:
        a tray having a bottom, three upstanding sides and an open edge, said tray dimensioned to have a larger perimeter than said birdcage, said tray containing a shallow body of water constantly being recycled by said containment system;

tubing disposed within said tray adjacent to a side directly opposite said open edge, for laterally discharging water into said tray so that a volume of water within said tray is maintained at a constant level and removal of water containing waste or contaminants via said open edge of said tray is induced; and a base assembly for supporting said tray directly beneath a grid floor of said birdcage, wherein said grid floor retains and separates a bird from said containment system while allowing waste and airborne contaminants to descend to said tray, said base assembly comprising:

a cabinet;

a hopper within which said tray rests, housed within said cabinet, said hopper having four sloping surfaces leading downward to an opening positioned at a bottom edge of said sloping surfaces, wherein water forced from said open edge of said tray descends into said hopper and is funneled to said opening of said hopper; and a filter unit positioned below said hopper within said cabinet to receive water from said opening of said hopper, said filter unit comprising:

a semi-divided tank housing a reservoir, pump, and a plurality of filters;

wherein water descending through said opening of said hopper is received by said filter unit, said filters in said filter unit remove waste and contaminants to generate filtered water, said pump returns filtered water to said tubing for discharge into said tray;

whereby, a constant volume of filtered water is distributed within said tray by said tubing and water containing waste and contaminants is recycled through said filter unit, via said hopper, filtered, and returned to said tray via said tubing by said pump in a continuous process.

2. The birdcage of claim 1, wherein said plurality of filters comprises:

a mesh basket, wherein water containing waste and contaminants is passed through said mesh basket and large elements of waste matter are filtered from the water;

a foam mat, wherein water proceeding from said mesh basket is passed through said foam mat and smaller elements of waste matter are filtered from the water;

a plurality of fiberglass blocks adapted to support bacterial life, wherein water proceeding from said foam mat is passed through said blocks and is subject to biological degradation, a carbon filter adapted to remove odors, wherein water is drawn through said carbon filter by said pump.

3. The birdcage of claim 1, further comprising:

a deflector cap comprising a detachable collar resting on and covering said upstanding sides of said tray, said collar comprising an angled surface to deflect debris inward towards said tray.

* * * * *